United States Patent [19]

Hubert

[11] Patent Number: 5,713,300

[45] Date of Patent: Feb. 3, 1998

[54] DIPSTICK TUBE INDICATOR

[76] Inventor: Ray Hubert, 1275 Justin Dr., Kankakee, Ill. 60901

[21] Appl. No.: 610,895

[22] Filed: Mar. 5, 1996

[51] Int. Cl.⁶ ................................................ G09F 3/00
[52] U.S. Cl. ........................ 116/28 R; 116/200; 116/201
[58] Field of Search ........................ 33/721, 722, 723, 33/724, 725, 726, 727, 728, 729, 730, 731; 116/28 R, 200, 201, 209

[56] References Cited

U.S. PATENT DOCUMENTS

| | | | |
|---|---|---|---|
| 2,059,009 | 10/1936 | McCarthy | 116/200 |
| 2,333,838 | 11/1943 | Wilson | 33/729 |
| 2,632,266 | 3/1953 | Sellwood | 116/205 X |
| 3,507,245 | 4/1970 | Grabow | 116/28 R |
| 5,042,167 | 8/1991 | Link | 33/725 |
| 5,241,753 | 9/1993 | Lalevee, Sr. | 33/726 |

*Primary Examiner*—William A. Cuchlinski, Jr.
*Assistant Examiner*—Willie Morris Worth
*Attorney, Agent, or Firm*—Hill, Steadman & Simpson

[57] ABSTRACT

The device for providing the visual location of the location of the end of the dipstick tube is provided. The device makes it easier for a motorist to replace the dipstick in the dipstick tube after checking the fluid level (i.e., motor oil level, transmission fluid level, etc.) of an internal combustion engine or other industrial apparatus. One preferred device made in accordance with the present invention includes a flat ring-shaped structure of a bright color that is mounted directly over the end of a dipstick tube.

2 Claims, 1 Drawing Sheet

DIPSTICK TUBE INDICATOR

FIELD OF THE INVENTION

This invention which relates to automotive accessories and more specifically to a device for visually indicating the opening of a dipstick tube. Still more specifically, the device provides visual indicator for a dipstick tube opening so that a motorist who is checking the oil or transmission fluid in a car may more easily replace the dipstick in the tube after checking the fluid level.

BACKGROUND OF THE INVENTION

It is critical that the oil level of an internal combustion engine be checked periodically for amount and cleanliness. In automobiles with automatic transmissions, the automatic transmission level must be periodically checked as well. It is conceivable that the automobiles of the future will have other fluid levels that must be carefully monitored as well. Because most retail gasoline stations no longer provide this service when a motorist purchases gasoline, the burden of performing these important chores falls on the motorist.

In order to check the oil level on the car, the motorist must pull the oil dipstick out of the oil dipstick tube, wipe it clean, re-insert the dipstick into the tube before removing the dipstick again and examining the level of oil on the end of the dipstick. After checking the oil level, the motorist must then replace the dipstick in the tube. Thus, in checking the oil level, the motorist must remove the dipstick from the dipstick tube twice. Removing the dipstick from the dipstick tube is normally not a problem once the dipstick is located. However, re-inserting the dipstick in the dipstick tube is problematic because the dipstick tubes are normally small, i.e., less that ½ inch in diameter, and they are difficult to locate alongside the engine. The problem of locating the dipstick is further compounded by the more space-efficient design of today's modern engines. Specifically, the modern automobile includes more working components underneath the hood in a smaller space. Thus, finding a naked dipstick tube amongst the numerous working components of an automobile engine is difficult and often frustrating.

Motorists are frequently irritated and frustrated by their inability to locate the oil dipstick tube after checking the oil level. This frustrating situation may be compounded if the motorist is forced to perform this chore when the weather is very cold, wet or extremely hot. As a result, motorists dislike checking the oil and automatic transmission fluid levels in their automobiles and therefore do not perform these tasks as often as required. Furthermore, motorists who do not understand the importance of checking the oil and automatic transmission levels may often neglect these chores to the extent that they cause damage to their automobiles.

Therefore, there is a strong need for a product which would facilitate the task of checking the oil level, the automatic transmission fluid level and other fluid levels in an automobile, truck, industrial equipment, farm machinery and the like. One key element of such product would be to provide a clearer visual indication of the location of the opening of the dipstick tube so that the operator can more easily replace the dipstick in the dipstick tube after checking the fluid level. Such a product would eliminate the frustration experienced by operators who cannot find the opening of the dipstick tube after checking the fluid level.

SUMMARY OF THE INVENTION

The invention provides means for visually indicating the opening of the dipstick tube. More specifically, the invention is a pliable or flexible ring that is accommodated around the dipstick tube adjacent to the upper opening or upper rim of the tube. The ring is preferably made from silicone rubber for its flexibility and heat resistance. However, the ring may also be made from a flexible metallic material or other heat resistant flexible material. The ring may be provided in a variety of dimensions so that the specific ring utilized will be snugly, mateably accommodated around the opening of the dipstick tube. The outer edge of the ring should extend at least ¼ inch outward from the opening of the tube to provide a clear visual indication. Further, the ring should preferably have a bright color for easy visual identification. The preferred embodiment is fabricated from silicone rubber that has a bright yellow color.

Motorists or equipment operators will be able to easily identify the location of the dipstick tubes that are equipped with the brightly colored ring of the present invention. Motorists and equipment operators will therefore be less frustrated in their attempts to replace the dipsticks in the dipstick tubes and will therefore be more inclined to check the fluid levels in their automobiles and/or equipment on a regular basis.

It is therefore an advantage of the present invention to provide a clear visual indicator for the location of the dipstick tube of an engine or other working apparatus.

Other advantages of the present invention will be apparent upon reading the following detailed description of the drawings and independent claims and upon reference to the accompanying drawings.

DESCRIPTION OF THE DRAWINGS

The invention is illustrated more or less diagrammatically in the accompanying drawings wherein.

It should be understood that the drawings are not necessarily to scale and that the embodiments are sometimes illustrated by graphic symbols, phantom lines, diagrammatic representations, and fragmentary views. In certain instances, details which are not necessary for understanding the present invention or which render details difficult to perceive may have been omitted. It should be understood, of course, that the invention is not necessarily limited to the particular embodiments illustrated here.

DETAILED DESCRIPTION OF THE DRAWINGS

Like numerals will be used to refer to like parts in the following description of the drawings.

Figure 1:
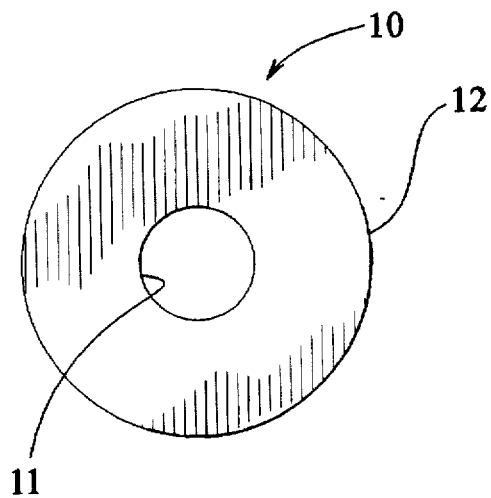
FIG. 1 is a plan view of a dipstick tube indicating device made in accordance with the present invention.
Figure 2:
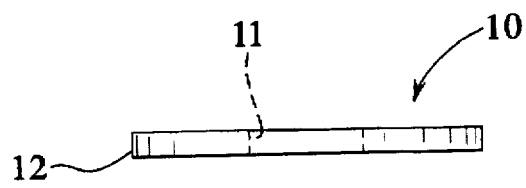
FIG. 2 is a elevational view of the dipstick tube indicating device shown in FIG. 1.
Figure 3:
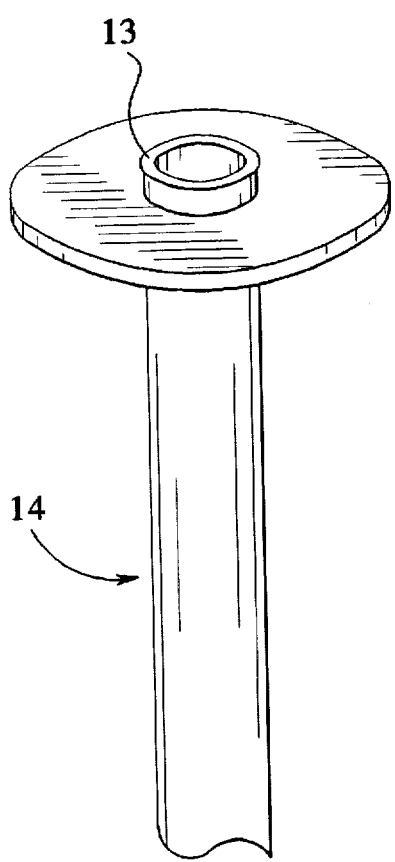
FIG. 3 is partial elevational view of a dipstick tube with a dipstick tube indicating device mounted onto the end of the dipstick tube.

In FIG. 1, the flat, ring-shaped device 10 is illustrated. In the embodiment, shown in FIG. 1, the device 10 is in the shape of a flat washer, which includes an inner edge 11 and an outer edge 12. The general thickness is indicated in FIG. 2. As noted above, one suitable material for fabricating the device 10 is silicone rubber, due to its heat resistance. The material should also be flexible so that it may be easily mounted over the upper rim 13 of a dipstick tube 14 as shown in FIG. 3.

In addition to silicone rubber, other flexible materials may be utilized, such as spring steel other polymeric materials. Whatever material that is employed, it should be flexible and heat resistant. Further, the material of must be of a bright color or able to be coated with a bright coloring. The purpose of the bright coloring is to insure the device 10 serves as a clear visual indicator for the location of the end or upper end 13 of the dipstick tube 14. One preferred color is bright yellow or florescent yellow. However, other bright colors or florescent colors will be satisfactory.

Figure 4:
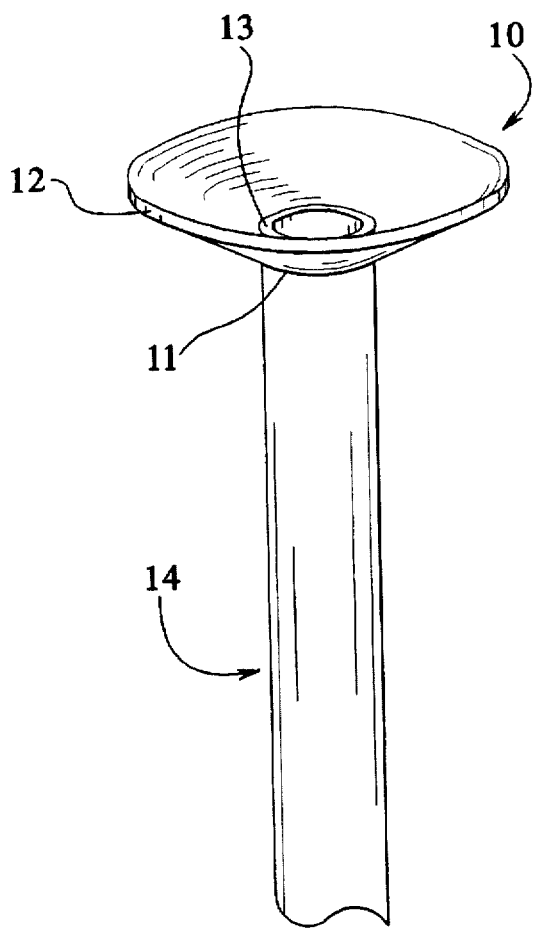
FIG. 4 is another partial elevational view of a dipstick tube with a dipstick tube indicating device mounted onto the end of the dipstick tube in a curled-up position.

As seen in FIG. 4, if the device 10 is fabricated from a flexible material, such as silicone rubber, the device 10 may be curled-up into the flared position as shown in FIG. 4. It has been found that the position in FIG. 4 provides an excellent visual indication of the location of the upper rim 13 of the dipstick tube 14.

The device 10 may be provided in a variety of sizes, depending upon the specific use. The outside diameter of oil dipstick tubes typically ranges from 5/16" to 11/16". Transmission fluid dipstick tubes are typically a little larger. Therefore, the outside diameter of the outer edge 12 of the device 10 for use on oil dipstick tubes may be approximately 1¼", but may range from about 1' to greater than 2", while outside diameter of a device to for use on transmission fluid dipstick tubes may be about 1⅜" but may vary from about 1" to greater than 2".

Thus, the present invention provides a clear visual indication or a flag as to the location of the upper rim 13 of a dipstick tube 14. A motorist or equipment operator who employs the device 10 shown in FIGS. 1–4 or a similar device made in accordance with the present invention will find it easier and less frustrating to replace the dipstick tube after testing a fluid level. By making the process of checking fluid levels easier and less frustrating, motorists and equipment operators will be more likely to check such fluid levels at regular intervals.

Although only one volume of the present invention has been illustrated and described, it will be once apparent to one skilled in the art that variations may be made within the spirit and of the scope of the invention. Accordingly, it is intended that the scope of the invention be limited solely by the scope of the hereafter claims and not by any specific wording in the foregoing description.

What is claimed is:

1. A method for visually indicating the location of an upwardly protruding dipstick tube of an engine, the dipstick tube having a cylindrically shaped outer surface of an outside diameter, the dipstick tube having an open end, providing a one-piece indicator consisting of:

a flat ring structure having a central opening defined by an inner edge of an inner diameter, the flat ring structure further including an outer periphery, the outer periphery having an outer diameter ranging from about 1" to about 2", the flat ring structure being fabricated from a brightly colored and pliable material, the inside diameter of the flat ring structure being smaller than the outside diameter of the dipstick tube so that the flat ring structure must be stretched in order to fit the opening of the flat ring structure over the open end of the dipstick tube resulting in a snug, mateably engaging fit between the flat ring structure and the dipstick; and placing the one-piece indicator over the open end of the dipstick tub.

2. An improved dipstick tube for an engine, the dipstick tube consisting of:

a cylindrically shaped outer surface of an outside diameter, the dipstick tube having an open end, the open end of the dipstick tube being fitted with a one-piece indicator for visually indicating the location of the dipstick tube, the one-piece indicator consisting of a flat ring structure having a central opening defined by an inner edge of an inner diameter, the flat ring structure further including an outer periphery, the outer periphery having an outer diameter ranging from about 1" to about 2", the flat ring structure being fabricated from a brightly colored and pliable material, the inside diameter of the flat ring structure being smaller than the outside diameter of the dipstick tube so that the flat ring structure must be stretched in order to fit the opening of the flat ring structure over the open end of the dipstick tube resulting in a snug, mateably engaging fit between the flat ring structure and the dipstick tube, the flat ring structure being disposed on the dipstick tube closely adjacent to the open end thereof.

* * * * *